(12) United States Patent
Nielsen et al.

(10) Patent No.: US 10,723,089 B2
(45) Date of Patent: Jul. 28, 2020

(54) METHOD OF MANUFACTURING A COMPOSITE LAMINATE STRUCTURE OF A WIND TURBINE BLADE PART AND RELATED WIND TURBINE BLADE PART

(71) Applicant: LM WP PATENT HOLDING A/S, Kolding (DK)

(72) Inventors: Lars Nielsen, Skanderborg (DK); Klavs Jespersen, Kolding (DK)

(73) Assignee: LM WP PATENT HOLDINGS A/S, Kolding (DK)

( * ) Notice: Subject to any disclaimer, the term of this patent is extended or adjusted under 35 U.S.C. 154(b) by 156 days.

(21) Appl. No.: 16/064,818

(22) PCT Filed: Dec. 19, 2016

(86) PCT No.: PCT/EP2016/081733
§ 371 (c)(1),
(2) Date: Jun. 21, 2018

(87) PCT Pub. No.: WO2017/108685
PCT Pub. Date: Jun. 29, 2017

(65) Prior Publication Data
US 2019/0001592 A1  Jan. 3, 2019

(30) Foreign Application Priority Data

Dec. 23, 2015 (EP) .................................. 15202401

(51) Int. Cl.
*B29C 70/54* (2006.01)
*B29C 70/88* (2006.01)
(Continued)

(52) U.S. Cl.
CPC .......... *B29C 70/547* (2013.01); *B29C 70/345* (2013.01); *B29C 70/443* (2013.01);
(Continued)

(58) Field of Classification Search
CPC ....... F03D 80/30; B29C 70/547; B29C 70/88; B29C 70/882; B29C 70/887; F05B 2280/2006
See application file for complete search history.

(56) References Cited

U.S. PATENT DOCUMENTS 4,622,091 A * 11/1986 Letterman ............. B29B 15/105
156/286
7,758,313 B2 * 7/2010 Eyb ........................ F03D 1/065
416/226
(Continued)

FOREIGN PATENT DOCUMENTS

EP  0 525 263 A1  2/1993
EP  1 990 178 A1  11/2008
(Continued)

OTHER PUBLICATIONS

International Search Report dated Apr. 7, 2017 issued in corresponding International Application No. PCT/EP2016/081733.
(Continued)

*Primary Examiner* — Michael Lebentritt
*Assistant Examiner* — Topaz L. Elliott
(74) *Attorney, Agent, or Firm* — Nath, Goldberg & Meyer; Jerald L. Meyer; Tanya E. Harkins (57) ABSTRACT

A method of manufacturing a composite laminate structure of a wind turbine blade part is performed by resin transfer moulding. The fibre-reinforcement material is impregnated with liquid resin in a mould cavity which includes a rigid mould part having a mould surface defining a surface of the wind turbine blade part. The method includes alternately stacking on the rigid mould part: i) a number of fibre-reinforcement layers including electrically conductive fibres and ii) a flow strip layer in form of a layer of flow strips having a strip width and which are arranged so as to form voids having a void width between two juxtaposed strips. The method includes sealing a second mould part against the rigid mould part in order to form the mould cavity, optionally evacuating the mould cavity, supplying a resin to the mould cavity, and curing the resin to form the composite laminate structure.

15 Claims, 6 Drawing Sheets

(51) Int. Cl.
  *B29C 70/44*    (2006.01)
  *F03D 80/30*    (2016.01)
  *B29C 70/34*    (2006.01)
  *F03D 1/06*     (2006.01)
  *B29L 31/08*    (2006.01)
  *B29C 70/48*    (2006.01)
  *B29K 307/04*   (2006.01)

(52) U.S. Cl.
  CPC .......... *B29C 70/882* (2013.01); *F03D 1/0675* (2013.01); *F03D 80/30* (2016.05); *B29C 70/48* (2013.01); *B29K 2307/04* (2013.01); *B29L 2031/085* (2013.01); *F05B 2240/21* (2013.01); *F05B 2240/30* (2013.01); *F05B 2280/2006* (2013.01); *F05B 2280/6003* (2013.01); *F05D 2300/224* (2013.01); *Y02P 70/523* (2015.11)

(56) References Cited

U.S. PATENT DOCUMENTS

| | | | | |
|---|---|---|---|---|
| 9,505,193 | B2* | 11/2016 | Bergstrom | B29C 70/547 |
| 9,714,478 | B2* | 7/2017 | Bergstrom | B29C 70/547 |
| 10,022,907 | B2* | 7/2018 | Bergstrom | B29C 70/50 |
| 10,035,301 | B2* | 7/2018 | Bergstrom | B29B 11/16 |
| 10,239,636 | B2* | 3/2019 | Collart | B29C 70/382 |
| 10,357,925 | B2* | 7/2019 | Parkin | B32B 5/02 |
| 2006/0035546 | A1* | 2/2006 | Mack | B32B 1/02 442/2 |
| 2015/0028514 | A1* | 1/2015 | Viard | B29C 70/545 264/156 |
| 2015/0183184 | A1* | 7/2015 | Bergstrom | B29C 70/547 112/440 |
| 2015/0204000 | A1* | 7/2015 | Bergstrom | B29C 70/547 442/352 |
| 2015/0292479 | A1* | 10/2015 | Ohlerich | B29B 43/56 416/226 |
| 2016/0130014 | A1* | 5/2016 | Collart | B32B 37/14 244/1 A |
| 2016/0288429 | A1* | 10/2016 | Bergstrom | B29C 70/48 |
| 2018/0245566 | A1* | 8/2018 | Sawada | F03D 80/30 |
| 2019/0039337 | A1* | 2/2019 | Nielsen | B29C 70/48 |

FOREIGN PATENT DOCUMENTS

| | | | | |
|---|---|---|---|---|
| EP | 2687356 A1 * | 1/2014 | ........ | B29C 70/226 |
| WO | 2015/095135 A1 | 6/2015 | | |
| WO | 2015/096840 A1 | 7/2015 | | |

OTHER PUBLICATIONS

Search Report dated Jun. 10, 2016 issued in corresponding European Application No. 15202401.4.

* cited by examiner

METHOD OF MANUFACTURING A COMPOSITE LAMINATE STRUCTURE OF A WIND TURBINE BLADE PART AND RELATED WIND TURBINE BLADE PART

This is a National Phase Application filed under 35 U.S.C. 371 as a national stage of PCT/EP2016/081733, filed Dec. 19, 2016, an application claiming the benefit of European Application No. 15202401.4, filed Dec. 23, 2015, the content of each of which is hereby incorporated by reference in its entirety.

FIELD OF THE INVENTION

The present disclosure pertains to the field of manufacturing composite laminate structures, and more specifically to manufacturing parts of wind turbine blades. The present disclosure relates to a method of manufacturing a composite laminate structure of a wind turbine blade part and a part of the wind turbine blade.

BACKGROUND OF THE INVENTION

A wind turbine blade usually comprises a composite laminate structure. The composite laminate structure is typically manufactured using fibre reinforcing material embedded in a polymer matrix. The laminate structure is typically formed by a plurality of stacked fibre layers. Today, the fibre layers are mostly selected from glass fibres or carbon fibres or a hybrid material comprising both glass fibres and carbon fibres.

To protect wind turbine blades from lightning damages, wind turbine blades are equipped with a lightning protection system. For wind turbine blades being reinforced with electrically conductive fibres, such as carbon fibres, the efficiency of the lightning protection system depends on having a conductivity property through the thickness of the composite laminate structures. The electrically conductive fibres are typically potentially equalised to the lightning protection system, advantageously to a down-conductor of the lightning protection system, at different positions or areas along the span of the blade.

The load carrying structure is typically manufactured by infusing stacked fibre layers with resin. To aid the resin flow during infusion, a flow media may be needed. This is particularly the case for carbon fibres due to the small size of the fibres and hence the size of spacings or voids between the fibres. However, placing a conventional flow media isolates or separates each fibre layers from one another. This results in significantly reducing the conductivity in between each carbon fibre layers.

There is thus a need for a solution that provides both flow for the resin to be infused and conductivity through stacked fibre layers.

SUMMARY OF THE INVENTION

It is an object of the present disclosure to provide a method of manufacturing a composite laminate structure of a wind turbine blade part and a part of a wind turbine blade which overcome or ameliorate at least one of the disadvantages of the prior art or which provide a useful alternative.

The present disclosure relates to a method of manufacturing a composite laminate structure of a wind turbine blade part by means of resin transfer moulding, preferably vacuum-assisted resin transfer moulding. The fibre-reinforcement material is impregnated with liquid resin in a mould cavity, wherein the mould cavity comprises a rigid mould part having a mould surface defining a surface of the wind turbine blade part. The method comprises alternately stacking on the rigid mould part:
i. a number of fibre-reinforcement layers comprising electrically conductive fibres, such as carbon fibres, and
ii. a flow strip layer in form of a layer of flow strips, each having a strip width, and which are arranged so as to form voids or spacings having a void width (i.e. a spacing width) between two juxtaposed strips.

The method comprises sealing a second mould part, advantageously a flexible mould part, against the rigid mould part in order to form the mould cavity. The method comprises optionally evacuating the mould cavity, such as in vacuum-based infusion. The method comprises supplying a resin to the mould cavity, i.e. the infusion phase. The method comprises curing or hardening the resin in order to form the composite laminate structure.

Thus, the present disclosure provides an improved method to manufacture composite structures that allows both to promote resin flow via the flow strips during infusion and maintain conductivity through the thickness of the composite structure under lightning strikes due to the voids or spacings between adjacent flow strips. The present disclosure also advantageously facilitates manufacturing of composite structures that have a thick carbon fibre laminate or hybrid material layers comprising carbon fibres while ensuring a proper wetting or infusion of laminate layers and ensuring a conductivity through the thickness of the laminate.

The present disclosure also relates to a wind turbine blade part comprising a composite laminate structure. The composite laminate structure comprises alternately stacked layers of:
i. a number of fibre-reinforcement layers comprising electrically conductive fibres, such as carbon fibres, and
ii. a flow strip layer in form of a layer of flow strips, each having a strip width, and which are arranged so as to form voids or spacings having a void width (i.e. a spacing width) between two juxtaposed strips.

The alternately stacked layers are embedded in a polymer matrix material, e.g. cured or hardened matrix, after resin infusion and curing.

It is clear that the aforementioned aspects of the invention may be combined in any way and are linked by the common aspect of enhancing flow and maintaining conductivity through the composite laminate structure.

It is noted that advantages enunciated with respect to the method of manufacturing a composite laminate structure of a wind turbine blade part apply to the wind turbine blade part.

BRIEF DESCRIPTION OF THE FIGURES

Embodiments of the invention will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

Composite laminate structures of wind turbine blade parts can be manufactured by means of resin transfer moulding, preferably vacuum-assisted resin transfer moulding. In resin transfer moulding, the fibre-reinforcement material is impregnated with liquid resin in a mould cavity. The mould cavity is typically formed between a rigid mould part having a mould surface defining a surface of the wind turbine blade part and a flexible mould part. The resin disperses in all directions in the mould cavity as a flow front moves towards the resin-free area. It is thus important to promote flow of resin. To do so, the present disclosure proposes to add flow strips between the fibre layers in an inventive manner that promotes flow but does not reduce conductivity across the fibre layers. Such a balance is difficult to strike.

The present disclosure achieves this balance by alternately arranging or stacking fibre-reinforcing layers that are conductive and a flow strip layer that comprises flow strips, each having a strip width, and which are arranged so as to form voids or spacings having a void or spacing width between two juxtaposed strips. The flow strips promote flow of resin through the fibre layers, and the voids or spacings allow two fibre-reinforcing layers to be in contact and thus conduct current through the thickness of the composite laminate structure.

The present disclosure relates to a method of manufacturing a composite laminate structure of a wind turbine blade part by means of resin transfer moulding, preferably vacuum-assisted resin transfer moulding. The fibre-reinforcement material is impregnated with liquid resin in a mould cavity, wherein the mould cavity comprises rigid mould part having a mould surface defining a surface of the wind turbine blade part. The method comprises alternately stacking on the rigid mould part:
i. a number of fibre-reinforcement layers comprising electrically conductive fibres, such as carbon fibres, and
ii. a flow strip layer in form of a layer of flow strips, each having a strip width, and which are arranged so as to form voids or spacing having a void or spacing width between two juxtaposed strips.

The method comprises sealing a second mould part, advantageously a flexible mould part, such as a vacuum bag, against the rigid mould part in order to form the mould cavity. The method comprises optionally evacuating the mould cavity, such as in vacuum-based infusion. The method comprises supplying a resin to the mould cavity, i.e. the infusion phase. The method comprises curing or hardening the resin in order to form the composite laminate structure. Infusing the plurality of stacked fibre layers with a resin may be performed using vacuum infusion or VARTM (vacuum assisted resin transfer moulding), which is typically employed for manufacturing composite structures, such as wind turbine blades comprising a fibre reinforced matrix material. During the process of filling the mould, a vacuum, the vacuum in this connection being understood as an under-pressure or negative pressure, is generated via vacuum outlets in the mould cavity, whereby liquid polymer is drawn into the mould cavity via the inlet channels in order to fill the mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity.

Ensuring a complete distribution of the polymer in the entire mould cavity is, however, often difficult, and accordingly this often results in so-called dry spots, i.e. areas with fibre material not being sufficiently impregnated with resin. Thus, dry spots are areas, where the fibre material is not impregnated, and where there can be air pockets, which are difficult or impossible to remove by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

In most cases the resin or polymer applied is polyester, vinyl ester or epoxy, but may also be PUR or pDCPD. Epoxies have advantages with respect to various properties, such as shrinkage during curing (in turn potentially leading to less wrinkles in the laminate), electrical properties and mechanical and fatigue strengths. Polyester and vinyl esters have the advantage that they provide better bonding properties to gelcoats. Thereby, a gelcoat may be applied to the outer surface of the shell during the manufacturing of the shell by applying a gelcoat to the mould before fibre-reinforcement material is arranged in the mould. Thus, various post-moulding operations, such as painting the blade, may be avoided. Further, polyesters and vinyl esters are cheaper than epoxies. Consequently, the manufacturing process may be simplified and costs may be lowered.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

As for instance blades for wind turbines have become bigger and bigger in the course of time and may now be more than 60 meters long, the impregnation time in connection with manufacturing such blades have increased, as more fibre material has to be impregnated with polymer. Furthermore, the infusion process has become more complicated, as the impregnation of large shell members, such as blades, requires control of the flow fronts to avoid dry spots, the control may e.g. include a time-related control of inlet channels and vacuum channels. This increases the time required for drawing in or injecting polymer. As a result, the polymer has to stay liquid for a longer time, normally also resulting in an increase in the curing time.

Alternatively, infusing the plurality of stacked fibre layers with a resin can be performed using Resin transfer moulding (RTM) which is similar to VARTM. In RTM the liquid resin is not drawn into the mould cavity due to a vacuum generated in the mould cavity. Instead the liquid resin is forced into the mould cavity via an overpressure at the inlet side.

According to some aspects, the composite laminate structure is a load-carrying structure of the wind turbine blade. The composite laminate structure has a longitudinal direction. The flow strips are aligned in a desired flow direction, such as a transverse direction with respect to the longitudinal direction or 40-45 degrees direction with respect to the longitudinal direction. The fibres of the fibre-reinforcement layers are aligned substantially in the longitudinal direction so as to provide stiffness to the load carrying structure. Accordingly, the reinforcement fibres may be unidirectional fibres being aligned substantially in the longitudinal direction. In one or more embodiments, the load-carrying structure is a spar cap integrated in a shell of the wind turbine blade.

It may be envisaged in one or more embodiments that the flow strips are secured to a fibre-reinforcement layer, such as integrated or stitched to the fibre-reinforcement layer. This would result in that steps i. and ii. may be carried out simultaneously, i.e. stacking layers on the rigid mould, where each layer comprises a number of fibre-reinforcement layers of conductive fibres alternately arranged with a flow strip layer with voids or spacings as disclosed herein.

According to some aspects of this disclosure, layers of flow strips are arranged so that flow strips of a first flow strip layer overlaps flow strips of a second flow strip layer. In other words, the flow strip layers are provided by placing a first flow strip layer and a second flow strip layer such that flow strips of the first flow strip layer overlaps with flow strips of the second flow strip layer. This may enhance the flow of resin during infusion, so that the resin can easily access every layer by flowing in the overlapping areas to ensure full wetting or infusion in a faster manner and with reduced risks of leaving air pockets. Accordingly, the resin may propagate from the flow strips through the thickness of the laminate structure. The flow front will then reach flow strips of another flow strip layer. Thereby, the arrangement of overlapping flow strips will ensure a proper wetting of the fibre reinforcement material both along the thickness of the laminate structure and in a transverse direction of the laminate structure.

In one or more embodiments, the strip width is larger than the void width or spacing width. This may further enhance flow of resin, since it is ensured that flow strips of the layers always overlap each other in a transverse direction of the laminate structure, while maintaining a sufficient level of conductivity across the conductive fibre layers, such as carbon fibre layers.

In one or more embodiments, the fibre-reinforcement layers and the layer of flow strips are arranged such that at least a number of electrically conductive fibres on a first fibre-reinforcement layer on a first side of a flow strip layer may contact a number of electrically conductive fibres on a second fibre-reinforcement layer on a second side of a flow strip layer through the void or spacing. In other words, the fibre-reinforcement layers and the layer of flow strips are arranged such that at least a number of electrically conductive fibres on a first fibre-reinforcement layer on a first side of a flow strip layer have sufficient contact to a number of electrically conductive fibres on a second fibre-reinforcement layer on a second side of a flow strip layer through the void or spacing, so as to conduct a current across the thickness of the composite laminate structure. Stated differently, the fibre-reinforcement layers and the layer of flow strips are arranged such that at least a number of electrically conductive fibres on a first fibre-reinforcement layer on a first side of a flow strip layer and a number of electrically conductive fibres on a second fibre-reinforcement layer on a second side of a flow strip layer are able to conduct current through the void or spacing.

Preferably, at least a number of flow strips are made of a bi-axial mesh. The flow strips are then able to promote flow in two desired directions. In one or more embodiments, the at least a number of flow strips are made of an open-meshed fabric. For example, the bi-axial mesh comprises a bi-axial open-meshed fabric. However, the flow strips may also be made of other open-meshed fabric or any other suitable material to promote flow.

In one or more embodiments, the fibre-reinforcement material is a hybrid material comprising glass fibres and carbon fibres. The hybrid material may for instance comprise glass fibre rovings and carbon fibre tows. The glass fibres rovings and carbon fibre tows may be arranged on a carbon fibre substrate. A spacing between carbon fibres tow may advantageously be smaller than the void or spacing width so as to allow conductivity through the void. Thereby, it is ensured that a carbon fibre tow on a fibre-reinforcement layer on one side of the flow strip layer may contact the carbon fibre substrate on a second side of the flow strip layer.

The present disclosure also relates to a wind turbine blade part comprising a composite laminate structure. The composite laminate structure comprises alternately stacked layers of:
 i. a number of fibre-reinforcement layers comprising electrically conductive fibres, such as carbon fibres, and
 ii. a flow strip layer in form of a layer of flow strips having a strip width and which are arranged so as to form voids having a void width between two juxtaposed strips.

The alternately stacked layers are embedded in a polymer matrix material, e.g. cured or hardened matrix, after resin infusion and curing.

In one or more embodiment, the composite laminate structure is a load carrying structure such as a spar, a spar cap, a main or principle laminate.

The wind turbine blade part as disclosed herein allows a wind turbine blade to be protected against any risk of delamination caused by lightning, since energy from a lightning strike may be dispersed through the entire thickness of the laminate structure.

The present disclosure also relates to a wind turbine comprising a wind turbine blade part according to this disclosure.

Figure 1:
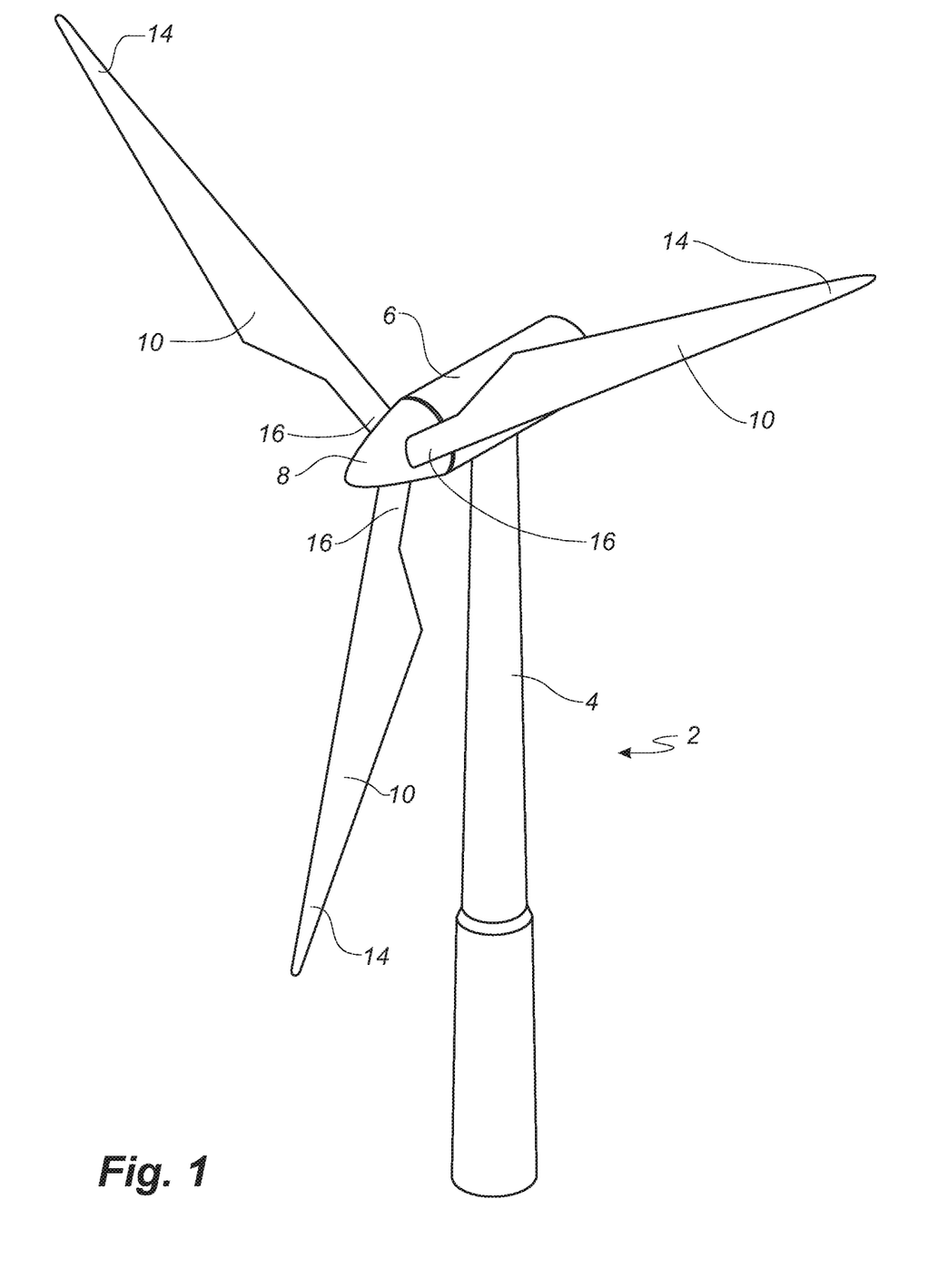
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
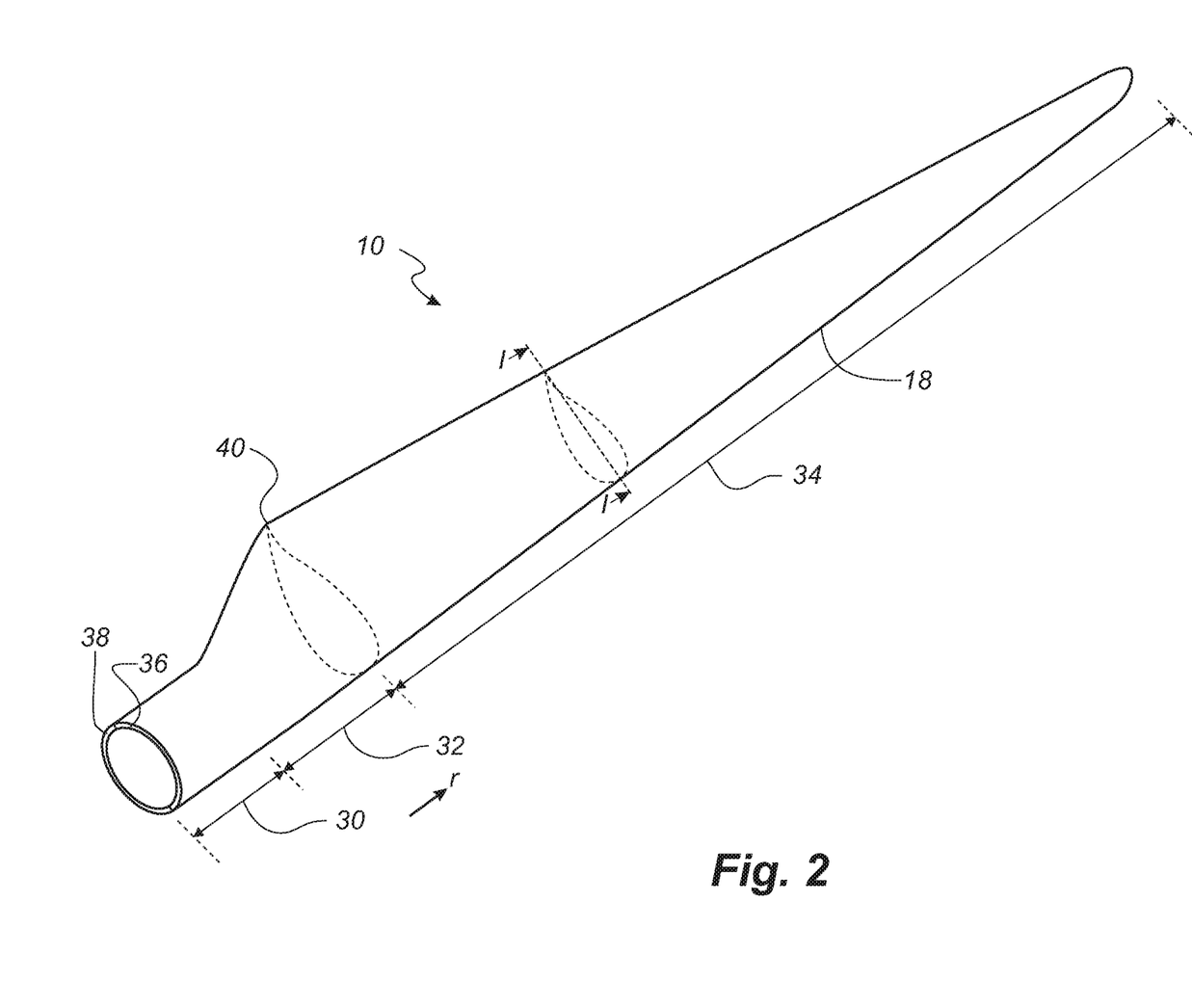
FIG. 2 shows a schematic view of a wind turbine blade according to the disclosure.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

Figure 3:
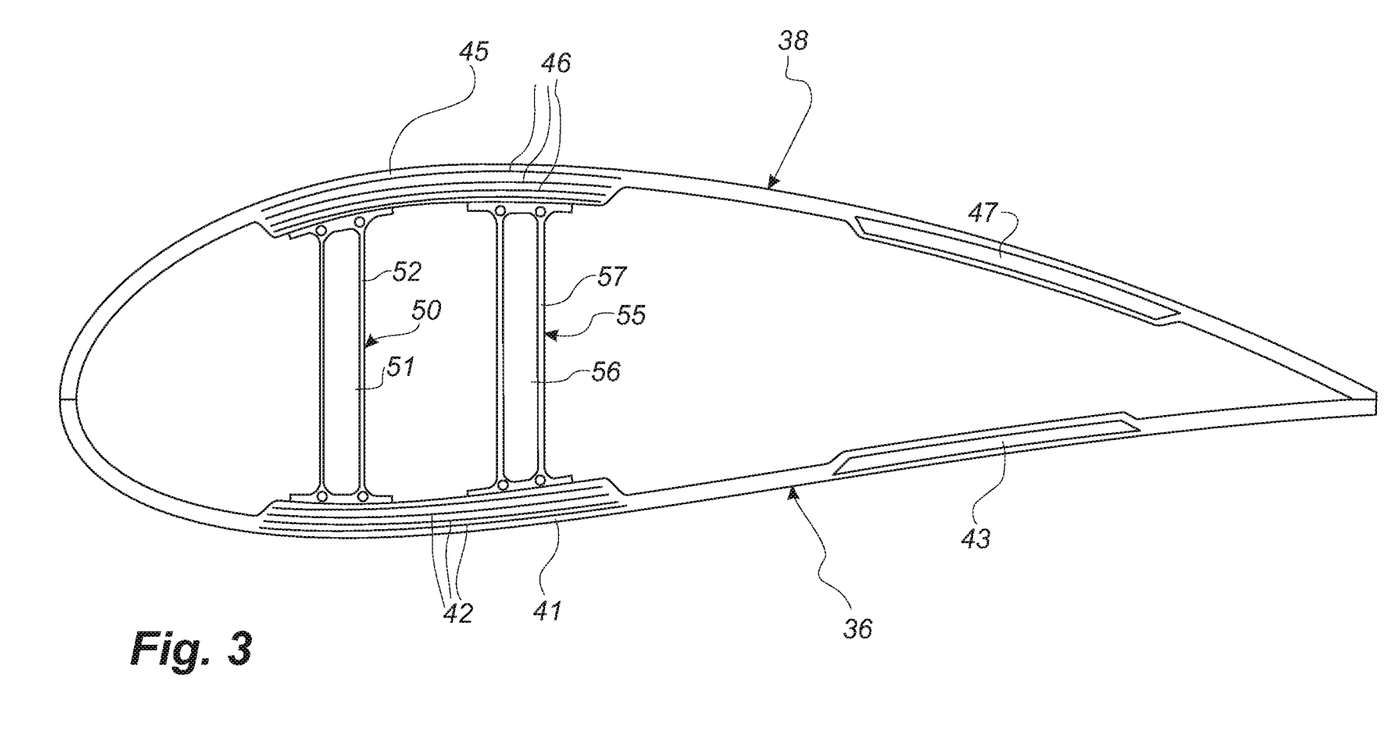
FIG. 3 shows a schematic view of a cross-section of a wind turbine blade.

FIG. 3 shows a schematic view of a cross-section of a wind turbine blade along the line I-I shown in FIG. 2. As previously mentioned, the blade 10 comprises a pressure side shell part 36 and a suction side shell part 38. The pressure side shell part 36 comprises a load carrying structure 41 such as spar cap or a main laminate, which constitutes a load bearing part of the pressure side shell part 36. The load carrying structure 41 comprises a plurality of fibre-reinforcement layers 42, such as unidirectional fibres aligned along the longitudinal direction of the blade in order to provide stiffness to the blade. The suction side shell part 38 also comprises a load carrying structure 45 comprising a plurality of fibre-reinforcement layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The load carrying structure 41 of the pressure side shell part 36 and the load carrying structure 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

Figure 4A:
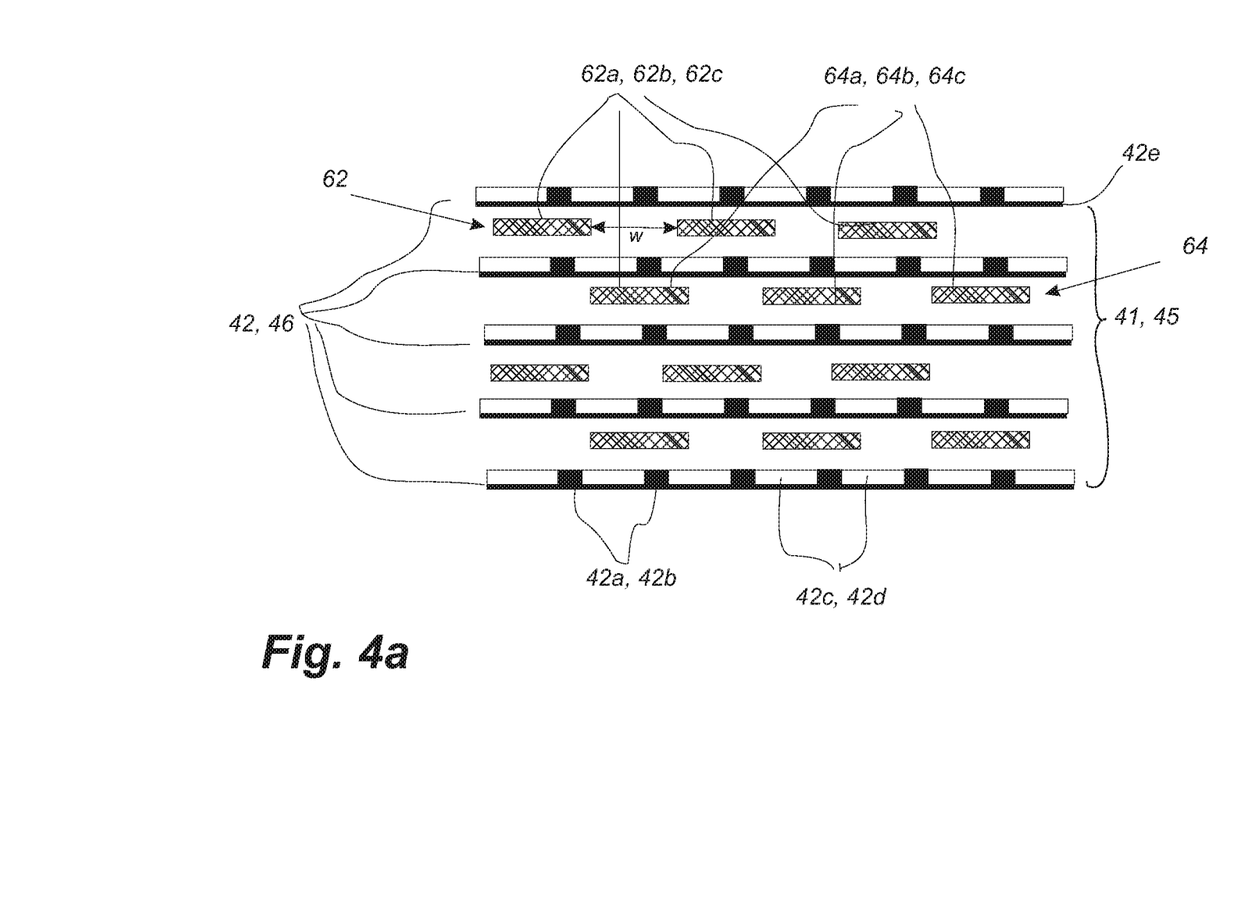
FIG. 4a shows schematically an exemplary layup or arrangement of fibre layers for an exemplary composite structure according to the disclosure.

FIG. 4a schematically shows an exploded cross-sectional view of an exemplary layup or arrangement of the fibre-reinforcement layers for the manufacturing of an exemplary composite structure according to the disclosure. The exemplary layup shows a stack that alternates a fibre-reinforcement layer 42, 46 with a flow strip layer 62. The fibre-reinforcement layer 42, 46 comprises electrically conductive fibres, such as carbon fibres. The fibre-reinforcement layer may for instance comprise a number of glass fibre rovings 42c, 42d and a number of carbon fibre tows 42a, 42b. The glass fibre rovings 42c, 42d and the carbon fibre tows 42a, 42b may be arranged on a carbon fibre substrate 42e.

The flow strip layer 62 comprises flow strips 62a, 62b, 62c having a strip width and which are arranged so as to form voids having a void width w between two juxtaposed flow strips 62a, 62b. The same applies to all fibre-reinforcement layers and flow strip layer shown in FIG. 4a.

The flow strip layers of FIG. 4a are arranged so that flow strips 62a, 62b, 62c of a first flow strip layer 62 overlaps flow strips 64a, 64b, 64c of a second flow strip layer 64. The strip width is larger than the void or spacing width w. The fibre-reinforcement layers 42, 46 and the flow strip layers 62, 64 are arranged such that the carbon fibre layer on a first side of a flow strip layer 62 is able to contact the carbon fibre layer on a second side of a flow strip layer 62 through the void or spacing. Although the exemplary layup of FIG. 4a shows a flow strip layer between every fibre-reinforcement layers. It may be envisaged that a flow strip layer is placed between every five to six or even more fibre-reinforcement layers. The spacing between flow strip layers should be arranged so as to ensure a proper wetting of the fibre-reinforcement material without causing for instance wrinkles in the fibre-reinforcement layers.

Figure 4B:
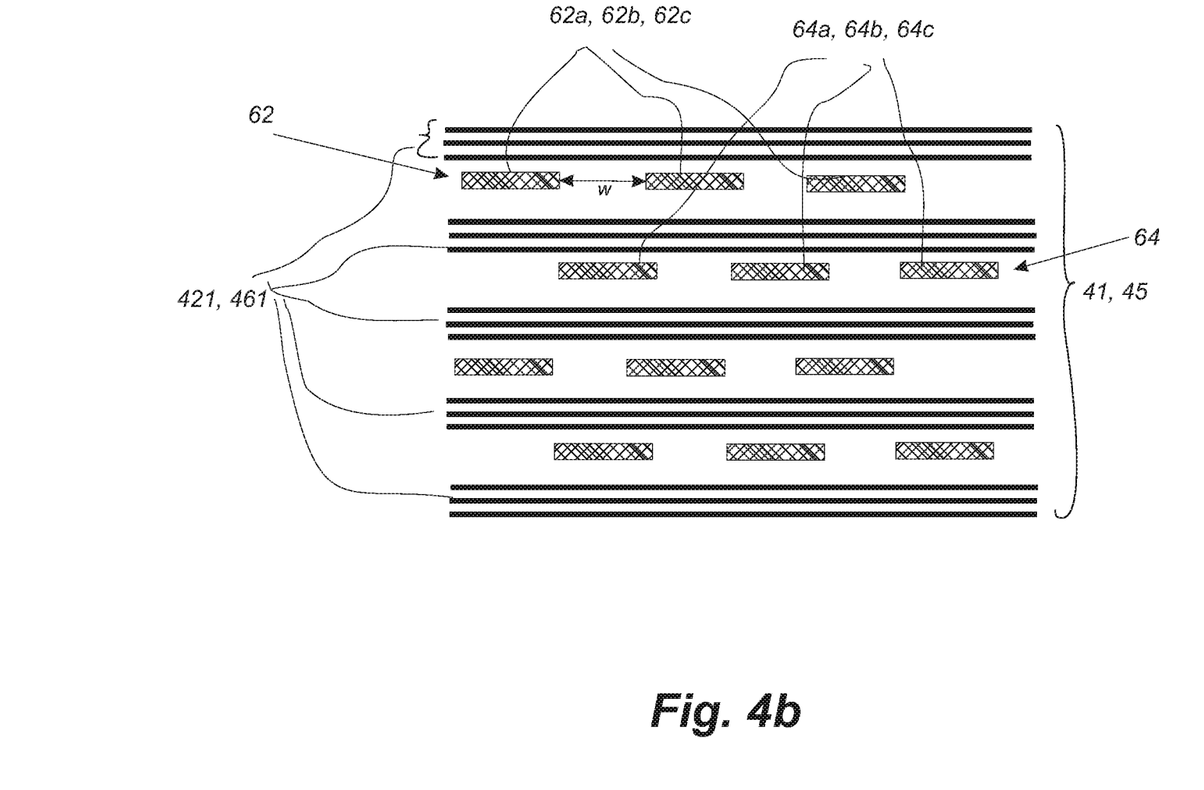
FIG. 4b shows schematically another exemplary layup or arrangement of fibre layers for an exemplary composite structure according to the disclosure.

FIG. 4b schematically shows an exploded cross-sectional view of another exemplary layup or arrangement of the fibre layers for an exemplary composite structure according to the disclosure. The exemplary layup shows a stack that alternates a fibre-reinforcement layer 421, 461 with a flow strip layer 62. The fibre-reinforcement layer 42, 46 comprises electrically conductive fibres, such as carbon fibres. The fibre-reinforcement layer may for instance be made of a pure carbon fibre layer 42e, e.g. having carbon fibre tows. The flow strip layer 62 comprises flow strips 62a, 62b, 62c having a strip width and which are arranged so as to form voids or spacings having a void or spacing width w between two juxtaposed flow strips 62a, 62b. The same is applies to all the fibre-reinforcement layers and flow strip layer shown in FIG. 4b. The flow strip layers of FIG. 4b are arranged so that flow strips 62a, 62b, 62c of a first flow strip layer 62 overlaps flow strips 64a, 64b, 64c of a second flow strip layer 64. The strip width is larger than the void or spacing width w. The fibre-reinforcement layers 42, 46 and the flow strip layers 62, 64 are arranged such that at least a number of the carbon fibres on a first fibre-reinforcement layer 421, 461 on a first side of a flow strip layer 62 is able to contact a number of carbon fibres on a second fibre-reinforcement layer 421,461 on a second side of a flow strip layer 62 through the void.

Figure 5:
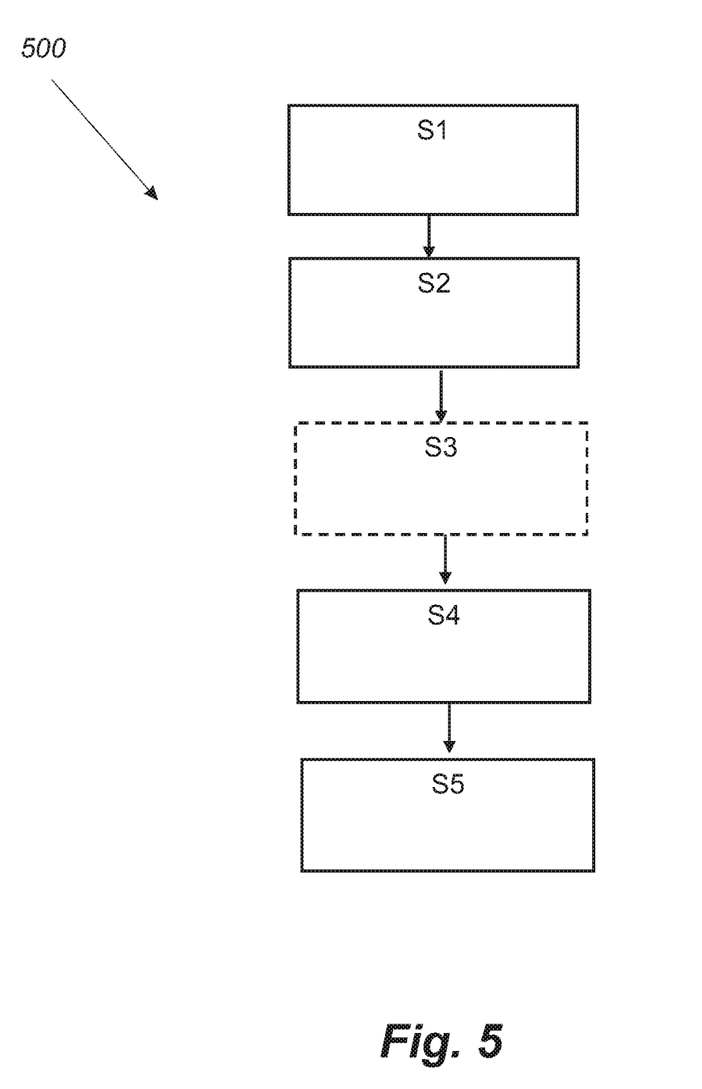
FIG. 5 shows a flow-chart illustrating a method of manufacturing a composite laminate structure of a wind turbine blade part according to this disclosure.

FIG. 5 shows a flow-chart illustrating a method 500 of manufacturing a composite laminate structure of a wind turbine blade part according to this disclosure. The wind turbine blade part is manufactured by means of resin transfer moulding, preferably vacuum-assisted resin transfer moulding, where fibre-reinforcement material is impregnated with liquid resin in a mould cavity. The mould cavity comprises rigid mould part having a mould surface defining a surface of the wind turbine blade part. The method 500 comprises alternately stacking S1 on the rigid mould part:
  i. a number of fibre-reinforcement layers comprising electrically conductive fibres, such as carbon fibres, and
  ii. a flow strip layer in form of a layer of flow strips, each having a strip width, and which are arranged so as to form voids or spacings having a void or spacing width between two juxtaposed strips.

The step of alternately stacking S1 may comprise arranging the flow strip layers so that flow strips of a first flow strip layer overlaps flow strips of a second flow strip layer. Additionally, or alternatively, the step of alternately stacking S1 may comprise arranging the fibre-reinforcement layers and the layer of flow strips such that at least a number of electrically conductive fibres on a first fibre-reinforcement layer on a first side of a flow strip layer is able to contact a number of electrically conductive fibres on a second fibre-reinforcement layer on a second side of a flow strip layer through the void or spacing.

The method 500 comprises sealing S2 a second mould part, advantageously a flexible mould part, such as a vacuum bag, against the rigid mould part in order to form the mould cavity. The method 500 may optionally comprise evacuating S3 the mould cavity. The method 500 comprises supplying S4a resin to the mould cavity. The method 500 comprises curing S4 or hardening the resin in order to form the composite laminate structure.

The invention has been described with reference to a preferred embodiment. However, the scope of the invention is not limited to the illustrated embodiment, and alterations and modifications can be carried out without deviating from the scope of the invention.

The invention claimed is:

1. A method of manufacturing a composite laminate structure of a wind turbine blade part by means of resin transfer moulding, where fibre-reinforcement material is impregnated with liquid resin in a mould cavity, wherein the mould cavity comprises a rigid mould part having a mould surface defining a surface of the wind turbine blade part, the method comprising the following steps:
   a. alternately stacking on the rigid mould part:
      i. a number of fibre-reinforcement layers comprising electrically conductive fibres, and
      ii. a flow strip layer in form of a layer of flow strips, each having a strip width, and which are arranged so as to form spacings having a spacing width between two juxtaposed strips, wherein the strip width is larger than the spacing width,
   b. sealing a second mould part against the rigid mould part in order to form the mould cavity,
   c. optionally evacuating the mould cavity,
   d. supplying a resin to the mould cavity, and
   e. curing or hardening the resin in order to form the composite laminate structure,
wherein the fibre-reinforcement layers and the layer of flow strips are arranged such that at least a number of electrically conductive fibres on a first fibre-reinforcement layer on a first side of one of the flow strip layers have sufficient contact with a number of electrically conductive fibres on a second fibre-reinforcement layer on a second side of the flow strip layer through the spacings to conduct a current across a thickness of the composite laminate structure.

2. The method according to claim 1, wherein the composite laminate structure is a load-carrying structure of the wind turbine blade, the composite laminate structure having a longitudinal direction, and wherein the flow strips are aligned in a desired flow direction and fibres of the fibre-reinforcement layers are aligned substantially in the longitudinal direction.

3. The method according to claim 2, wherein the load-carrying structure is a spar cap integrated in a shell of the wind turbine blade.

4. The method according to claim 1, wherein the flow strips are secured to one of the fibre-reinforcement layers.

5. The method according to claim 1, wherein the layers of flow strips are arranged so that flow strips of a first flow strip layer overlap flow strips of a second flow strip layer.

6. The method according to claim 1, wherein at least a number of flow strips are made of a bi-axial mesh.

7. The method according to claim 1, wherein at least a number of flow strips are made of an open-meshed fabric.

8. The method according to claim 1, wherein the fibre-reinforcement material is a hybrid material comprising glass fibres and carbon fibres, and wherein a spacing between carbon fibres is smaller than the spacing width.

9. The method according to claim 1, wherein the number of fibre-reinforcement layers of step a.i. is between 3 and 9.

10. The method according to claim 1, wherein said resin transfer moulding comprises vacuum-assisted resin transfer moulding.

11. The method according to claim 1, wherein the electrically conductive fibres comprise carbon fibres.

12. A wind turbine blade part comprising a composite laminate structure, wherein the composite laminate structure comprises alternately stacked layers of:
   i. a number of fibre-reinforcement layers comprising electrically conductive fibres, and
   ii. a flow strip layer in form of a layer of flow strips having a strip width and which are arranged so as to form spacings having a spacing width between two juxtaposed strips, wherein the strip width is larger than the spacing width, and wherein
   the alternately stacked layers are embedded in a polymer matrix material, wherein the fibre-reinforcement layers and the layer of flow strips are arranged such that at least a number of electrically conductive fibres on a first fibre-reinforcement layer on a first side of one of the flow strip layers have sufficient contact with a number of electrically conductive fibres on a second fibre-reinforcement layer on a second side of the flow strip layer through the spacings to conduct a current across a thickness of the composite laminate structure.

13. A wind turbine comprising the wind turbine blade part according to claim 12.

14. The wind turbine blade part according to claim 12, wherein the electrically conductive fibres comprise carbon fibres.

15. A method of manufacturing a composite laminate structure of a wind turbine blade part by means of resin transfer moulding, where fibre-reinforcement material is impregnated with liquid resin in a mould cavity, wherein the mould cavity comprises a rigid mould part having a mould surface defining a surface of the wind turbine blade part, the method comprising the following steps:
   a. alternately stacking on the rigid mould part:
      i. a number of fibre-reinforcement layers comprising electrically conductive fibres, and
      ii. a flow strip layer in form of a layer of flow strips, each having a strip width, and which are arranged so as to form spacings having a spacing width between two juxtaposed strips, wherein the strip width is larger than the spacing width, wherein at least a number of flow strips are made of a material selected from the group consisting of a bi-axial mesh and an open-meshed fabric,
   b. sealing a second mould part against the rigid mould part in order to form the mould cavity,
   c. optionally evacuating the mould cavity,
   d. supplying a resin to the mould cavity, and
   e. curing or hardening the resin in order to form the composite laminate structure,
wherein the fibre-reinforcement layers and the layer of flow strips are arranged such that at least a number of electrically conductive fibres on a first fibre-reinforcement layer on a first side of one of the flow strip layers have sufficient contact with a number of electrically conductive fibres on a second fibre-reinforcement layer on a second side of the flow strip layer through the spacings to conduct a current across a thickness of the composite laminate structure.

* * * * *

UNITED STATES PATENT AND TRADEMARK OFFICE
CERTIFICATE OF CORRECTION

PATENT NO. : 10,723,089 B2  
APPLICATION NO. : 16/064818  
DATED : July 28, 2020  
INVENTOR(S) : Nielsen et al.

Page 1 of 1

It is certified that error appears in the above-identified patent and that said Letters Patent is hereby corrected as shown below:

On the Title Page

Item (73), please remove the Assignee: "LM WP PATENT HOLDINGS A/S" and replace with "LM WP PATENT HOLDING A/S"

Signed and Sealed this  
Twenty-second Day of September, 2020

Andrei Iancu  
*Director of the United States Patent and Trademark Office*